United States Patent
Akiyama

(10) Patent No.: US 10,416,542 B2
(45) Date of Patent: Sep. 17, 2019

(54) LIGHT SOURCE DEVICE, LIGHT SOURCE UNIT, AND PROJECTOR

(71) Applicant: SEIKO EPSON CORPORATION, Tokyo (JP)

(72) Inventor: Koichi Akiyama, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/758,082

(22) PCT Filed: Sep. 21, 2016

(86) PCT No.: PCT/JP2016/004310
§ 371 (c)(1),
(2) Date: Mar. 7, 2018

(87) PCT Pub. No.: WO2017/051534
PCT Pub. Date: Mar. 30, 2017

(65) Prior Publication Data
US 2018/0252992 A1 Sep. 6, 2018

(30) Foreign Application Priority Data

Sep. 24, 2015 (JP) ................................ 2015-186325

(51) Int. Cl.
*G03B 21/16* (2006.01)
*G03B 21/20* (2006.01)
*H04N 9/31* (2006.01)

(52) U.S. Cl.
CPC .......... *G03B 21/16* (2013.01); *G03B 21/204* (2013.01); *G03B 21/208* (2013.01);
(Continued)

(58) Field of Classification Search
None
See application file for complete search history.

(56) References Cited

U.S. PATENT DOCUMENTS

2012/0133904 A1* 5/2012 Akiyama ............. G02B 27/102
353/38
2012/0268503 A1 10/2012 Sugiyama et al.
(Continued)

FOREIGN PATENT DOCUMENTS

JP 2012-118302 A 6/2012
JP 2012-234162 A 11/2012
(Continued)

OTHER PUBLICATIONS

Nov. 29, 2016 International Search Report issued in Patent Application No. PCT/JP2016/004310.

*Primary Examiner* — Elmito Breval
(74) *Attorney, Agent, or Firm* — Oliff PLC

(57) ABSTRACT

A light source device including a light emitting device that emits a first light and a second light; a first light separation element that separates the first light into a first light beam flux and a second light beam flux; a second light separation element that separates the second light into a third light beam flux and a fourth light beam flux; at least one fluorescent body layer that includes a first fluorescence emitting section on which the first light beam flux is incident and a second fluorescence emitting section on which the third light beam flux is incident; and at least one diffusion section that includes a first diffusion light emitting section on which the second light beam flux is incident and a second diffusion light emitting section on which the fourth light beam flux is incident.

13 Claims, 7 Drawing Sheets

(52) U.S. Cl.
CPC ....... *G03B 21/2066* (2013.01); *H04N 9/3105* (2013.01); *H04N 9/3158* (2013.01); *H04N 9/3164* (2013.01)

(56) References Cited

U.S. PATENT DOCUMENTS

| | | |
|---|---|---|
| 2013/0021582 A1 | 1/2013 | Fujita et al. |
| 2014/0268066 A1 | 9/2014 | Guthrie |
| 2015/0042961 A1* | 2/2015 | Miyamae ............. H04N 9/3105 353/33 |
| 2015/0103320 A1* | 4/2015 | Iijima ................. G03B 21/006 353/31 |
| 2015/0153020 A1* | 6/2015 | Akiyama ........... G03B 21/2073 353/20 |
| 2016/0223892 A1* | 8/2016 | Takahashi ............ H04N 9/3111 |

FOREIGN PATENT DOCUMENTS

| | | |
|---|---|---|
| JP | 2013-47777 A | 3/2013 |
| JP | 2013-250494 A | 12/2013 |
| JP | 2014-174555 A | 9/2014 |
| JP | 2015-106130 A | 6/2015 |

* cited by examiner

LIGHT SOURCE DEVICE, LIGHT SOURCE UNIT, AND PROJECTOR

BACKGROUND

Technical Field

The present invention relates to a light source device, a light source unit, and a projector.

Related Art

In recent years, a laser light source, from which light of high brightness and high output is obtained, is used for a projector. For example, a projector using fluorescence that is generated by causing blue laser light to be incident on a fluorescent body layer and a diffusion light of the blue laser light is disclosed in JP-A-2013-250494.

SUMMARY

However, in the projector, for example, in a case where an intensity of the blue laserlight is increased in order to obtain a high light output, a temperature of the fluorescent body layer or a diffusion plate increases. In this case, if the cooling ability of the fluorescent body layer or the diffusion plate is not sufficient, there is a concern that light emission efficiency of the fluorescent body layer is lowered or the diffusion plate is damaged by heat.

The invention is made in view of such a circumstance and an object thereof is to provide a light source device, a light source unit, and a projector capable of obtaining a high light output while reducing temperature rise.

According to a first aspect of the invention, there is provided a light source device including: a light emitting device that emits a first light and a second light; a first light separation element that separates the first light into a first light beam flux and a second light beam flux; a second light separation element that separates the second light into a third light beam flux and a fourth light beam flux; at least one fluorescent body layer that includes a first fluorescence emitting section on which the first light beam flux is incident and a second fluorescence emitting section on which the third light beam flux is incident; and at least one diffusion section that includes a first diffusion light emitting section on which the second light beam flux is incident and a second diffusion light emitting section on which the fourth light beam flux is incident.

According to the light source device of the aspect, is possible to suppress each light amount incident on the first fluorescence emitting section, the second fluorescence emitting section, the first diffusion light emitting section, and the second diffusion light emitting section. Therefore, the temperature rise of the fluorescent body layer is reduced so that the light source device can efficiently emit the fluorescence. Therefore, it is possible to obtain a high light output. In addition, it is possible to prevent occurrence of troubles such as excessively strong light being incident on the first diffusion light emitting section and the second diffusion light emitting section so that the diffusion section is damaged.

Moreover, in the present specification, the fluorescence emitting section refers to a region on which an excitation light is incident at a certain moment in the fluorescent body layer. As long as an optical path of the excitation light is fixed, even if the fluorescent body layer moves, the fluorescence emitting section does not move. In addition, the diffusion light emitting section refers to a region on which the light is incident at a certain moment in the diffusion section. Similarly, the diffusion light emitting section also does not move.

In the aspect, the light source device may further include a first homogenizer optical system that is provided on an optical path of the fir light between the light emitting device and the first light separation element; a second homogenizer optical system that is provided on an optical path of the second light between the light emitting device and the second light separation element; a first condensing optical system that is provided on an optical path of the first light beam flux between the first light separation element and the first fluorescence emitting section; a second condensing optical system that is provided on an optical path of the third light beam flux between the second light separation element and the second fluorescence emitting section; a third condensing optical system that is provided on an optical path of the second light beam flux between the first light separation element and the first diffusion light emitting section; and fourth condensing optical system that provided on an optical path of the fourth light beam flux between the second light separation element and the second diffusion light emitting section. A length of the optical path between the first condensing optical system and the first homogenizer optical system may be equal to a length of the optical path between the second condensing optical system and the second homogenizer optical system. A length of the optical path between the third condensing optical system and the first homogenizer optical system may be equal to a length of the optical path between the fourth condensing optical system and the second homogenizer optical system.

According to the configuration, the lengths of the optical paths of the light incident on the first diffusion light emitting section and the second diffusion light emitting section are equal to each other, so that it is possible to equalize the brightness of the diffusion light emitted from the first diffusion light emitting section and the second diffusion light emitting section. In addition, the lengths of the optical paths of the light incident on the first fluorescence emitting section and the second fluorescence emitting section are equal to each other, so that it is possible to equalize the brightness of the fluorescence emitted from the first fluorescence emitting section and the second fluorescence emitting section.

In the aspect, the light source device may further include a first lens integrator optical system and a second lens integrator optical system. The first fluorescence emitting section may emit a third light toward the first light separation element. The second fluorescence emitting section may emit a fourth light toward the second light separation element. The first diffusion light emitting section may emit a fifth light toward the first light separation element. The second diffusion light emitting section may emit a sixth light toward the second light separation element. The third light and the fifth light may be synthesized by the first light separation element. The fourth light and the sixth light may be synthesized by the second light separation element. The third light and the fifth light synthesized by the first light separation element may be incident on the first lens integrator optical system. The fourth light and the sixth light synthesized by the second light separation element may be incident on the second lens integrator optical system. A secondary light source image formed by the third light, secondary light source image formed by the fourth light, a secondary light source image formed by the fifth light, and a secondary light source image formed by the sixth light may be formed on the same plane.

According to the configuration, it is possible to adopt a reflection type fluorescence emitting section and the diffusion light emitting section. In addition, for example, the third light and the fifth light transmitted through the first lens integrator optical system, and the fourth light and the sixth light transmitted through the second lens integrator optical system can be preferably superimposed on each other on a lighting area by combining one superimposing lens.

It is further preferable that the light source device further includes a superimposing lens on which the light emitted from the first lens integrator optical system and the light emitted from the second lens integrator optical system are incident.

According to the configuration, the illuminance on the lighting area can be made uniform.

In the aspect the light source device may further include a first base material that is capable of rotating around a first rotation axis and supports at least one fluorescent body layer. At least one fluorescent body layer may be configured of one fluorescent body layer provided around the first rotation axis. An optical axis may be positioned between the first fluorescence emitting section and the second fluorescence emitting section when viewed from a direction perpendicular to a main light beam of the first light incident on the first light separation element and the optical axis of the superimposing lens.

According to the configuration, the first fluorescence emitting section and the second fluorescence emitting section are in a state of being separated by a certain distance in a rotation direction of the first base material.

Therefore, it is possible to reduce the temperature rise of the fluorescent body layer.

In the aspect, a distance between the first fluorescence emitting section and the first rotation axis may be different from a distance between the second fluorescence emitting section and the first rotation axis.

According to the configuration, it is possible to further reduce the temperature rise of the fluorescent body layer.

In the aspect, the light source device may further include a second base material that is capable of rotating around a second rotation axis and supports at least one diffusion section. At least one diffusion section may be configured of one diffusion section provided around the second rotation axis. A central optical axis may be positioned between the first diffusion light emitting section and the second diffusion light emitting section when viewed from a direction perpendicular to the optical axis of the superimposing lens and the central optical axis of the light emitting device orthogonal to the optical axis.

According to the configuration, the first diffusion light emitting section and the second diffusion light emitting section are in a state of being separated by a certain distance in a rotation direction of the second base material.

Therefore, it is possible to further reduce the temperature rise of the diffusion section.

In the aspect, a distance between the first diffusion light emitting section and the second rotation axis may be different from a distance between the second diffusion light emitting section and the second rotation axis.

According to the configuration, it is possible to further reduce the temperature rise of the diffusion section.

In the aspect, each of the first homogenizer optical system and the second homogenizer optical system may be configured by a pair of lens arrays.

According to the configuration, the first light and the second light can be uniformized with a simple configuration.

In the aspect, the first condensing optical system and the second condensing optical system may have the same configuration. The third condensing optical system and the fourth condensing optical system may have the same configuration.

According to the configuration, it is possible to suppress occurrence of a shift in the length of the optical path of the light incident on the first fluorescence emitting section and the second fluorescence emitting section. In addition, it is possible to suppress occurrence of a shift in the length of the optical path of the light incident on the first diffusion light emitting section and the second diffusion light emitting section.

In the aspect, each of the first lens integrator optical system and the second lens integrator optical system may be configured of a pair of lens arrays.

According to the configuration, the third light, the fourth light, the first diffusion light, and the second diffusion light can be uniformized with a simple configuration.

According to a second aspect of the invention, there is provided a light source unit including: a first light source device and a second light source device. Each of the first light source device and the second light source device is configured of the light source device according to the first aspect. A superimposing lens in the first light source device and a superimposing lens in the second light source device are configured of one lens member.

According to the light source unit of the aspect, the light generated by the first light source device and the light generated by the second light source device can be superimposed on each other on the lighting area by using one superimposing lens.

According to a second aspect of the invention, there is provided a projector including: a lighting apparatus that includes the light source device according to the first aspect, or the light source unit according to the second aspect; an optical modulation device that forms an image light by modulating the light; emitted from the lighting apparatus according to image information; and a projection optical system that projects the image light.

According to the projector of the aspect, since the projector includes the light source device and the light source unit, a bright image can be displayed.

DESCRIPTION OF EXEMPLARY EMBODIMENTS

Hereinafter, embodiments of the invention will be described in detail with reference to the drawings. Moreover, the drawings used in the following description, for the sake of easy understanding of features, there are cases where characteristic portions are illustrated enlarged for convenience and it is not always that a dimensional ratio of each component is the same as the actual ratio.

First Embodiment

An example of a projector according to an embodiment will be described. The projector of the embodiment is a projection type image display device that displays a color image on a screen (projected surface). The projector includes three liquid crystal optical modulation devices corresponding to each color light of red light, green light, and blue light. The projector includes a semiconductor laser by which a high rightness and high output light can be obtained as a light source of a lighting apparatus.

Figure 1:
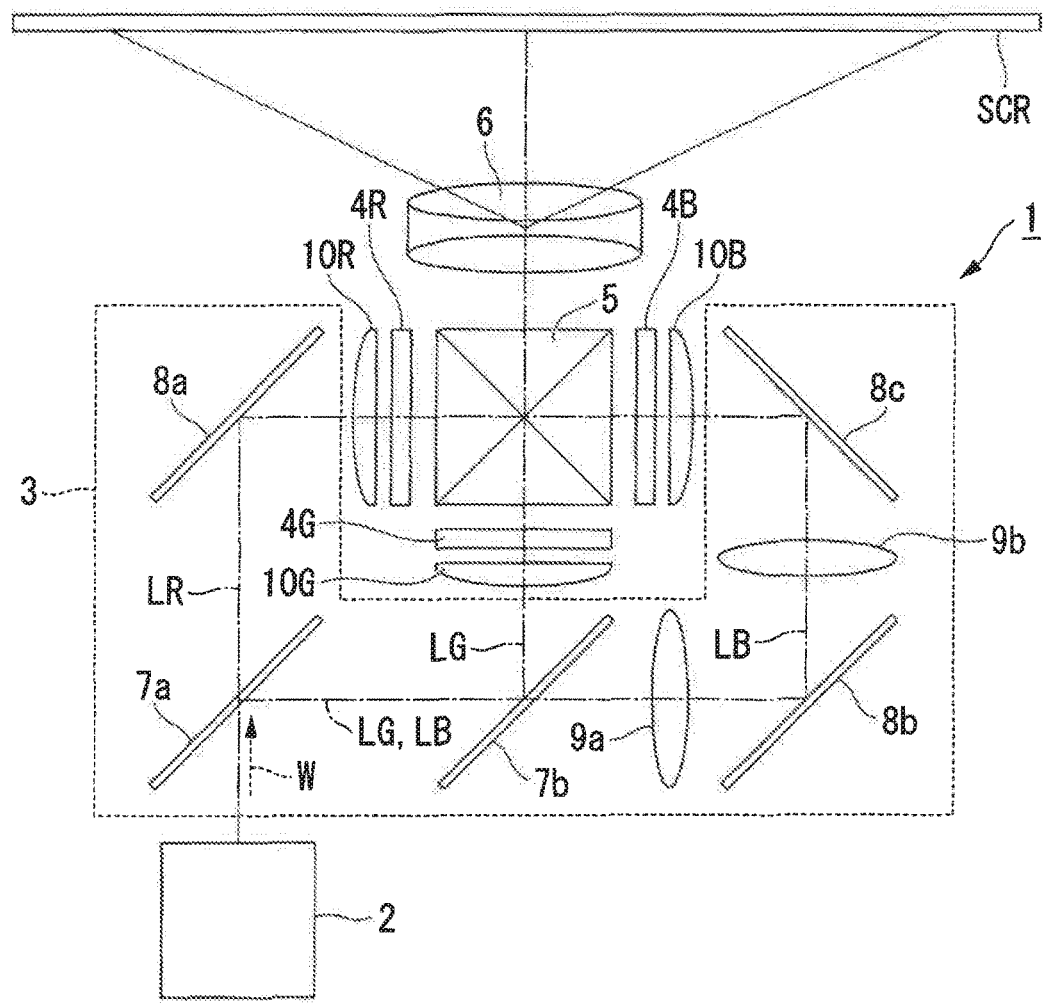
FIG. 1 is a schematic diagram illustrating an optical system of a projector according to a first embodiment.

FIG. 1 is a schematic diagram illustrating an optical system of a projector according to the first embodiment. As illustrated in FIG. 1, a projector 1 mainly includes a light source device 2, a color separation optical system 3, an optical modulation device 4R, an optical modulation device 4G, an optical modulation device 4B, a synthesis optical system 5, and a projection optical system 6.

In the embodiment, the light source device 2 emits a white light W as a lighting light toward the color separation optical system 3.

The color separation optical system 3 is provided to separate the white light W into a red light LR, a green light LG, and a blue light LB. The color separation optical system 3 mainly includes a first dichroic mirror 7a, a second dichroic mirror 7b, a first total reflection mirror 8a, a second total reflection mirror 8b, a third total reflection mirror 8c, a first relay lens 9a, and a second relay lens 9b.

The first dichroic mirror 7a has a function of separating the white light W from the light source device 2 into the red light LR and other light (green light LG and blue light LB). The first dichroic mirror 7a transmits the separated red light LR and reflects other light (green light LG and the blue light LB). On the other hand, the second dichroic mirror 7b has a function of separating the other light into the green light LG and the blue light LB. The second dichroic mirror 7b reflects the green light LG and transmits the blue light LB which are separated.

The first total reflection mirror 8a is disposed in an optical path of the red light LR and reflects the red light LR transmitted by the first dichroic mirror 7a to the optical modulation device 4R. On the other hand, the second total reflection mirror 8b and the third total reflection mirror 8c are disposed in an optical path of the blue light LB and guides the blue light LB transmitted by the second dichroic mirror 7b to the optical modulation device 4B.

The green light LG is reflected by second dichroic mirror 7b to the optical modulation device 4G.

The first relay lens 9a and the second relay lens 9b are disposed in a lower stage of second dichroic mirror 7b in the optical path of the blue light LB. The first relay lens 9a and the second relay lens 9b have a function of compensating an optical loss of the blue light LB caused by the fact that a length of the optical path of the blue light LB is longer than a length of the optical path of the red light LR or the green light LG.

The optical modulation device 4R modulates the red light LR depending on image information and forms image light corresponding to the red light LR while causing the red light LR to pass through. The optical modulation device 4G modulates the green light LG depending on image information and forms image light corresponding to the green light LG while causing the green light LG to pass through. The optical modulation device 4B modulates the blue light LB depending on image information and forms image light corresponding to the blue light LB while causing the blue light LB to pass through.

For the optical modulation device 4R, the optical modulation device 4G, and the optical modulation device 4B, for example, a transmission type liquid crystal panel is used. In addition, a pair of polarizing plates (not illustrated) is disposed on an incident side and an emission side of the liquid crystal panel and is configured to cause only linear polarized light in a specific direction to pass through.

A field lens 10R, a field lens 10G, and a field lens 10B are respectively disposed on the incident side of the optical modulation device 4R, the optical modulation device 4G, and the optical modulation device 4B. The field lens 10R, the field lens 10G, and the field lens 10B are used to collimate the red light LR, the green light LG, and the blue light LB incident on the optical modulation device 4R, the optical modulation device 4G, and the optical modulation device 4B respectively.

The synthesis optical system 5 synthesizes the image light corresponding to the red light LR, the green light LG, and the blue light LB, and emits synthesized image light to the projection optical system 6. For the synthesis optical system 5, for example, a cross dichroic prism is used.

The projection optical system 6 is configured of a projection lens group. The projection optical system 6 projects the image light synthesized by the synthesis optical system 5 to a screen SCR in an enlargement manner. Thus, an enlarged color video is displayed on the screen SCR.

(Light Source Device)

Next, a configuration of the light source device 2 will be described. Hereinafter, each configuration of the light source device will be described using an XYZ coordinate as necessary.

Figure 2:
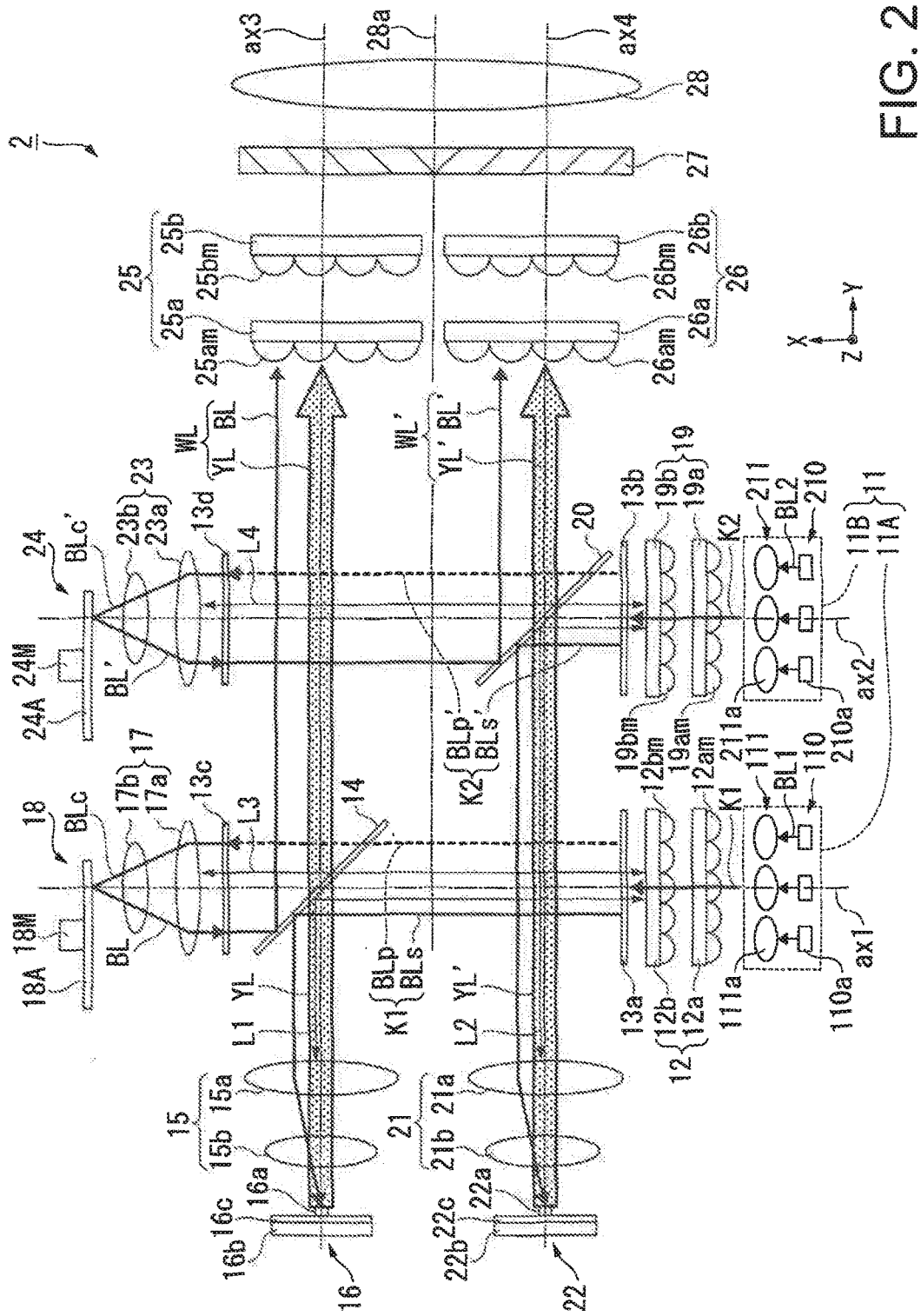
FIG. 2 is a diagram illustrating a schematic configuration of a light source device.

FIG. 2 is a diagram illustrating a schematic configuration of the light source device 2. Moreover, in FIG. 2, an X direction is a direction parallel to optical axes ax1 and ax2, a Y direction is a direction parallel to optical axes ax3 and ax4 which are orthogonal to the optical axes ax1 and ax2, and a Z direction is a direction orthogonal to the X direction and the Y direction.

The light source device 2 emits the white light W as lighting light. The white light W is configured of a lighting light WL and a lighting light WL' which are described later.

The light source device 2 includes a light emitting device 11, a first homogenizer optical system 12, a first phase difference plate 13a, a first light separation element 14, a first pickup optical system 15, a first fluorescent light emitting element 16, a third phase difference plate 13c, a third pickup optical system 17, a first diffusion element 18, a second homogenizer optical system 19, a second phase difference plate 13b, a second light separation element 20, a second pickup optical system second fluorescent light emitting element 22, a fourth phase difference plate 13d, a fourth pickup optical system 23, a second diffusion element a first lens integrator unit 25, a second lens integrator unit 26, a polarization conversion element 27, and a superimposing lens 28.

The light emitting device 11 includes a first light emitting device 11A and a second light emitting device 11B.

The first light emitting device 11A, the first homogenizer optical system 12, the first phase difference plate 13a, the first light separation element 14, the third phase difference plate 13c, the third pickup optical system 17, and the first diffusion element 18 are arranged side by side in this order on the optical axis ax1. In addition, the second light emitting device 11B, the second homogenizer optical system 19, the second phase difference plate 13h, the second light separation element 20, the fourth phase difference plate 13d, the fourth pickup optical system 23, and the second diffusion element 24 are arranged side by side in s order on the optical axis ax2.

The first fluorescent light emitting element 16, the first pickup optical system 15, the first light separation element 14, the first lens integrator unit 25, the polarization conversion element 27, and the superimposing lens 28 are arranged side by side in this order on the optical axis ax3.

The second fluorescent light emitting element 22, the second pickup optical system 21, the second light separation element 20, the second lens integrator unit 26, the polarization conversion element 27, and the superimposing lens 28 are arranged side by side in this order on the optical axis ax4.

Moreover, the optical axes ax1, ax2, ax3, and ax4 are in the same plane. The optical axis ax1 and the optical axis ax2 are parallel to each other and the optical axis ax3 and the optical axis ax4 are parallel us each other.

In addition, the optical axis ax1 is orthogonal to the optical axis ax3.

The first light emitting device 11A includes a first light emitting section 110 and a first collimate optical system 111.

In the embodiment, the first pickup optical system 15 corresponds to "the first condensing optical system" of the claims, the second pickup optical system 21 corresponds to "the second condensing optical system" of the claims, the third pickup optical system 17 corresponds to "the third condensing optical system" of the claims, and the fourth pickup optical system 23 corresponds to "the fourth condensing optical system" of the claims.

In the embodiment, a length L1 of the optical path bet seen the first pickup optical system 15 and the first homogenizer optical system 12 is equal to a length L2 of the optical path between the second pickup optical system 21 and the second homogenizer optical system 19. In addition, a length L3 of the optical path between the third pickup optical system 17 and the first homogenizer optical system 12 is equal to a length L4 of the optical path between the fourth pickup optical system 23 and the second homogenizer optical system 19.

The first light emitting section 110 includes a plurality of semiconductor lasers 110a as a solid-state light source. The plurality of the semiconductor lasers 110a are arranged side by side in an array shape in the same plane orthogonal to the optical axis ax1. The semiconductor lasers 110a emit, for example, a blue light BL1 (for example, laser light of which a peak wavelength is 460 nm). In the embodiment, the first light emitting section 110 emits a light beam flux K1 composed of a plurality of a blue light beams BL1.

The first collimate optical system 111 converts the light beam flux K1 emitted from the first light emitting section 110 into a parallel light beam. The first collimate optical system 111 is configured of, for example, a plurality of collimator lenses 111a arranged side by side in an array shape. Each of the plurality of the collimator lenses 111a are arranged corresponding to the plurality of the semiconductor lasers 110a.

The light beam flux K1 collimated by the first collimate optical system 111 is incident on the first homogenizer optical system 12. The first homogenizer optical system 12 is configured of, for example, a first lens array 12a and a second lens array 12b. The first lens array 12a includes a plurality of first small lenses 12am and the second lens array 12b includes a plurality of second small lenses 12bm. In the embodiment, the first lens array 12a and the second lens array 12b correspond to "a pair of the lens arrays" of the claims.

The light beam flux K1 passing through the first homogenizer optical system 13 is incident on the first phase difference plate 13a. The first phase difference plate 13a is, for example, a half-wave plate arranged to be rotatable. The light beam flux K1 is linear polarized light. The light transmitted by the first phase difference plate 13a is light including an S polarized light component and a P polarized light component with respect to the first light separation element 14 at a predetermined ratio. That is, it is possible to set the ratio of the S polarized light component and the P polarized light component to a predetermined value by appropriately setting a rotation angle of the first phase difference plate 13a.

The first light separation element 14 is configured of, for example, a dichroic mirror having wavelength selectivity. The first light separation element 14 is disposed so as to form an angle of 45° with respect to the optical axis ax1 and the optical axis ax3 respectively. The first light separation element 14 reflects the S polarized light component in the incident light (light beam flux K1) and transmits the P polarized light component in the incident light. That is, the first light separation element 14 has a function of separating the light beam flux K1 that is the incident light into the light (light beam flux BLs) of the S polarized light component and the light (light beam flux BLp) of the P polarized light component. In the embodiment, the light beam flux K1 corresponds to "the first light" of the claims, the light beam flux BLs corresponds to "the first light beam flux" of the claims, and the light beam flux BLp corresponds to "the second light beam flux" of the claims.

The light beam flux BLs of the S polarized light component is reflected by the first light separation element 14 and is directed to the first fluorescent light emitting element 16. The light beam flux BLp of the P polarized light component transmits the first light separation element 14 and is directed to the first diffusion element 18. The first light separation element 14 has a color separating function of allowing a fluorescent light YL which is described later having a wavelength band different from that of the light beam flux K1 to transmit therethrough regardless of a polarization state thereof.

As described below, the first light separation element 14 reflects the dispersed blue light BL from the first diffusion element 18 and transmits the fluorescent light YL from the first fluorescent light emitting element 16 thereby synthesizing them to generate the white lighting light WL based on the configuration.

The light beam flux BLs reflected by the first light separation element 14 is incident on the first pickup optical system 15. The first pickup optical system 15 has a function of condensing the light beam flux BLs toward a fluorescent body layer 16a of the first fluorescent light emitting element 16 and a function of picking up the fluorescent light YL emitted from the fluorescent body layer 16a.

In addition, the first pickup optical system 15 cooperates with the first homogenizer optical system 12 to uniformize an illuminance distribution by the light beam flux BLs on the fluorescent body layer 16a. The first pickup optical system 15 is configured of, for example, pickup lenses 15a and 15b.

The light beam flux BLs emitted from the first pickup optical system 15 is incident on the first fluorescent light emitting element 16. In the embodiment, the first fluorescent light emitting element 16 is disposed in a focal point position of the first pickup optical system 15.

The first fluorescent light emitting element 16 includes a substrate 16b and the fluorescent body layer 16a. The first fluorescent light emitting element 16 emits the fluorescent light YL toward the same side as a side on which the light beam flux BLs is incident. The substrate 16b is configured of, for example, a metallic disk having excellent heat dissipation properties such as aluminum or copper.

In the embodiment, a region in the fluorescent body layer 16a, on which the light beam flux BLs is incident, corresponds to "the first fluorescence emitting section" of the claims and the fluorescent light YL corresponds to "the third light" of the claims.

The fluorescent body layer 16a includes fluorescent body particles emitting the light beam flux BLs by converting the light beam BLs into the yellow fluorescent light YL by absorbing the light beam BLs. As the fluorescent body particles, for example, it is possible to use a YAG (yttrium aluminum garnet)-based fluorescent body. Moreover, a formation material of the fluorescent body particles may be one type or a material that is obtained by mixing particles formed by using material of two or more types may be used as the fluorescent body particles.

For the fluorescent body layer 16a, it is preferable that a material which is excellent in heat resistance and surface processability is used. For such a fluorescent body layer 16a, for example, it is possible to preferably use a fluorescent body layer that is obtained by dispersing the fluorescent body particles in an inorganic binder such as alumina, a fluorescent body layer that is obtained by sintering the fluorescent body particles without using a binder, and the like.

A reflection section 16c is provided on a side opposite to the side on which the light beam flux BLs of the fluorescent body layer 16a is incident. The reflection section 16c reflects the fluorescent light YL generated by the fluorescent body layer 16a.

The fluorescent light YL emitted from the fluorescent body layer 16a is collimated by the first pickup optical system 15 and transmits the first light separation element 14.

On the other hand, the light beam flux BLp emitted from the first light separation element 14 is incident on the third phase difference plate 13c. The third phase difference plate 13c is configured of a quarter-wave plate (λ/4 plate). The light beam flux BLp transmits the third phase difference plate 13c thereby being converted into a circularly polarized light beam flux BLc. The light beam flux BLc transmitted through the third phase difference plate 13c is incident on the third pickup optical system 17.

The third pickup optical system 17 has a function of condensing the light beam flux BLc toward the first diffusion element 18 and a function of picking up the diffusion light emitted from the first diffusion element 18. The third pickup optical system 17 is configured of, for example, pickup lenses 17a and 17b.

In addition, the third pickup optical system cooperates with the first homogenizer optical system 12 to uniformize the illuminance distribution by the light beam flux BLc on the first diffusion element 18. In the embodiment, the first diffusion element 18 is disposed at the focal point position of the third pickup optical system 17.

The first diffusion element 18 diffuses and reflects the light beam flux BLc emitted from the third pickup optical system 17 toward the first light separation element 14. Hereinafter, the light reflected by the first diffusion element 18 refers to the diffusion blue light BL. In the embodiment, the diffusion blue light BL corresponds to "the fifth light" in the claims.

The first ion element 18 includes a diffusion reflection plate 18A and a driving device 18M such as a motor for rotating the diffusion reflection plate 18A. The diffusion reflection plate 18A is configured of, for example, a member having light reflectivity. The diffusion reflection plate 18A has unevenness on a surface thereof. In the embodiment, the surface of the diffusion reflection plate 18A having the unevenness corresponds to "the diffusion section" in the claims and a region in the diffusion reflection plate 18A, on which the light beam flux BLc is incident, corresponds to "the first diffusion light emitting section" in the claims.

A rotation axis of the driving device 18M is disposed substantially parallel to the optical axis ax1. Therefore, the diffusion reflection plate 18A is configured to be rotatable in a surface intersecting a main light beam of the light beam flux BLc incident on the diffusion reflection plate 18A. The diffusion reflection plate 18A is formed in, for example, a circular shape when viewed from a direction of the rotation axis.

The circularly polarized diffusion blue light BL, which is reflected by the diffusion reflection plate 18A and transmits again through the third pickup optical system 17, transmits again through the third phase difference plate 13c to become the S polarized light. The diffusion blue light BL of the S polarized light is incident and reflected on the first light separation element 14.

The first light separation element 14 synthesizes the fluorescent light YL transmitting the first light separation element 14 and the diffusion blue light BL reflected by the first light separation element 14 to generate the white lighting light WL.

The second light emitting device 11B has a similar configuration as the first light emitting device 11A and includes a second light emitting section 210 and a second collimate optical system 211.

The second light emitting section 210 includes a plurality of semiconductor lasers 210a and emits a light beam flux K2 formed of a plurality of blue light beams BL2. The second collimate optical system 211 converts the light beam flux K2 emitted from the second light emitting section 210 into a parallel light flux. The second collimate optical system 211 is configured of, for example, a plurality of collimator lenses 211a arranged side by side in an array shape. Each of the plurality of the collimator lenses 211a is disposed corresponding to the plurality of the semiconductor lasers 210a.

The light beam flux K2 collimated by the second collimate optical system 211 is incident on the second homogenizer optical system 19. The second homogenizer optical system 19 is configured of, for example, a first lens array 19a and a second lens array 19b. The first lens array 19a includes a plurality of first small lenses 19am and the second lens array 19b includes a plurality of second small lenses 19bm. In the embodiment, the first lens array 19a and the second lens array 19b correspond to "a pair of lens arrays" of the claims.

The light beam flux K2 passing through the second homogenizer optical system 19 is incident on the second phase difference plate 13b. The second phase difference plate 13b has the same configuration as the first phase difference plate 13a. Therefore, it is possible to set the ratio of the polarized light component and the P polarized light component with respect to the second light separation element 20 by appropriately setting a rotation angle of the second phase difference plate 13b.

Similar to the first light separation element 14, the second light separation element 20 is configured of, for example, a dichroic mirror having the wavelength selectivity. The second light separation element 20 is disposed so as to form an angle of 45° with respect to the optical axis ax2 and the optical axis ax4 respectively. The second light separation element 20 and the first light separation element 14 are disposed on the same plane.

The second light separation element 20 reflects the polarized light component in the incident light (the light beam flux K2) and transmits the P polarized light component in the incident light. That is, the second light separation element 20 has a function of separating the light beam flux K2 that is the incident light into the light (the light beam flux BLs') of the S polarized light component and the light (the light beam flux BLp') of the P polarized light component. In the embodiment, the light beam flux K2 corresponds to "the second light" of the claims, the light beam flux BLs' corresponds to "the third light beam flux" of the claims, and the light beam flux BLs' corresponds to "the fourth light beam flux" of the claims. In the present specification, the light beam flux BLs and the light beam flux BLs' may be collectively referred to as excitation light.

The light beam flux BLs' of the S polarized light component reflects on the second light separation element 20 and is directed to the second fluorescent light emitting element 22. The light beam flux BLp' of the P polarized light component transmits the second light separation element 20 and is directed to the second diffusion element 24. The second light separation element 20 has a color separating function of allowing a fluorescent light YL' having a wavelength band different from that of the light beam flux K2 to be transmitted irrespective of the polarization state.

As described below, the second light separation element 20 reflects the dispersed blue light BL' from the second diffusion element 24 and transmits the fluorescent light from the second fluorescent light emitting element 22 thereby synthesizing them to generate a white lighting light WL' based on the configuration.

The light beam flux BLs' reflected by the second light separation element 20 is incident on the second pickup optical system 21. The second pickup optical system 21 has the same configuration as the first pickup optical system 15. Therefore, it is easy to set a length of the optical path of the light beam flux BLs incident on the first fluorescent light emitting element 16 to be equal to a length of the optical path of the light beam flux BLs' incident on the second fluorescent light emitting element 22.

The second pickup optical system 21 is configured of, for example, pickup lenses 21a and 21b and has a function of condensing the light beam flux BLs' toward a fluorescent body layer 22a of the second fluorescent light emitting element 22 and a function of picking up the fluorescent light YL' emitted from the fluorescent body layer 22a.

The second pickup optical system 21 cooperates with the second homogenizer optical system 19 to uniformize the illuminance distribution by the light beam flux BLs' on the fluorescent body layer 22a.

The light beam flux BLs' emitted from the second pickup optical system 21 is incident on the second fluorescent light emitting element 22. In the embodiment, the second fluorescent light emitting element 22 is disposed on the focal point position of the second pickup optical system 21.

The second fluorescent light emitting element 22 includes a substrate 22b and the fluorescent body layer 22a that absorbs the light beam flux BLs' converts the light beam flux BLs' into the yellow fluorescent light YL', and emits the yellow fluorescent light YL'. A reflection section 26c is provided on a side opposite to a side of the fluorescent body layer 22a on which the light beam flux BLs' is incident.

Therefore, the second fluorescent light emitting element 22 emits the fluorescent light YL' toward the same side as the side on which the light beam flux BLs' is incident. The substrate 22b is configured of, for example, a metallic disk having excellent heat dissipation properties such as aluminum or copper. In the embodiment, a region in the fluorescent body layer 22a, on which the light beam flux BLs' is incident, corresponds to "the second fluorescence emitting section" of the claims and the fluorescent light YL' corresponds to "the fourth light" of the claims.

The fluorescent light YL' emitted from the fluorescent body layer 22a is collimated by the second pickup optical system 21 and transmits the second light separation element 20.

On the other hand, the light beam flux BLp' emitted from the second light separation element 20 is incident on the fourth phase difference plate 13d. The fourth phase difference plate 13d is configured of a quarter-wave plate (λ/4 plate). The light beam flux BLp' transmits the fourth phase difference plate 13d thereby being converted into a circularly polarized light beam flux BLc'. The light beam flux BLc' transmitted through the fourth phase difference plate 13d is incident on the fourth pickup optical system 23.

The fourth pickup optical system 23 has a function of condensing the light beam flux BLc' toward the second diffusion element 24 and a function of picking up the diffusion light emitted from the second diffusion element 24. The fourth pickup optical system 23 has the same configuration of that of the third pickup optical system 17. The fourth pickup optical system 23 is configured of, for example, pickup lenses 23a and 23b, Therefore, it is easy to set a length of the optical path of the light beam flux BLp incident on the first diffusion element 18 to be equal to a length of the optical path of the light beam flux BLp' incident on the second diffusion element 24.

The fourth pickup optical system 23 cooperates with the second homogenizer optical system 19 to uniformize the illuminance distribution by the light beam flux BLc' on the second diffusion element 24. In the embodiment, the second diffusion element 24 is disposed at the focal point position of the fourth pickup optical system 23.

The second diffusion element 24 diffuses and reflects the light beam flux BLc' emitted from the fourth pickup optical system 23 toward the second light separation element 20. Hereinafter, the light reflected by the second diffusion element 24 refers to a diffusion blue light BL' In the embodiment, the diffusion blue light BL' corresponds to "the sixth light" in the claims.

The second diffusion element 24 includes a diffusion reflection plate 24A and a driving device 24M such as a motor for rotating the diffusion reflection plate 24A. The diffusion reflection plate 24A is configured of, for example, a member having light reflectivity. The diffusion reflection plate 24A has unevenness on a surface thereof. In the embodiment, the surface of the diffusion reflection plate 24A having the unevenness corresponds to "the diffusion section" in the claims and a region in the diffusion reflection plate 24A, on which the light beam flux BLc' is incident, corresponds to "the second diffusion light emitting section" in the claims.

A rotation axis of the driving device 24M is disposed substantially parallel to the optical axis ax2. Therefore, the diffusion reflection plate 24A is configured to be rotatable in a surface intersecting a main light beam of the light beam flux BLc' incident on the diffusion reflection plate 24A. The diffusion reflection plate 24A is formed in, for example, a circular shape when viewed from a direction of the rotation axis.

The circularly polarized diffusion blue light BL', which is reflected by the diffusion reflection plate 24A and transmits again through the fourth pickup optical system 23, transmits again through the fourth phase difference plate 13d to become the S polarized light. The diffusion blue light BL' of the S polarized light is incident and reflected on the second light separation element 20.

The second light separation element 20 synthesizes the fluorescent light YL' transmitting the second light separation element 20 and the diffusion blue light BL' reflected by the second light separation element 20 to generate the white lighting light WL'.

The white lighting light WL synthesized by the first light separation element 14 is incident on the first lens integrator unit 25. The first lens integrator unit 25 is configured of, for example, a first lens array 25a and a second lens array 25b, The first lens array 25a includes a plurality of first small lenses 25am and the second lens array 25b includes a plurality of second small lenses 25bm. In the embodiment, the first lens array 25a and the second lens array 25b correspond to "a pair of lens arrays" of the claims.

The first lens array 25a separates the lighting light WL into a plurality of small light beam fluxes. The first small lens 25am forms an image on the second small lens 25bm corresponding to the small light beam flux. The image formed on the second small lens 25bm is derived from the diffusion blue light BL and the fluorescent light. YL. That is, secondary light source image of the diffusion blue light BL and a secondary light source image of the fluorescent light YL are formed in the second lens array 25b.

The lighting light WL passing through the first lens integrator unit 25 is incident on the polarization conversion element 27. The polarization conversion element 27 is configured of, for example, a polarization separating film and a phase difference plate, and converts the lighting light WL into the linear polarized light.

The lighting light WL passing through the polarization conversion element 27 is incident on the superimposing lens 28. The lighting light WL emitted from the superimposing lens 28 is incident on the color separation optical system 3. The superimposing lens 28 superimposes the plurality of the small light beam fluxes constituting the lighting light WL to each other in the lighting area.

On the other hand, the white lighting light WL' synthesized by the second light separation element 20 is incident on the second lens integrator unit 26. The second lens integrator unit 26 has the same configuration as that of the first lens integrator unit 25 and is configured of, for example, a first lens array 26a and a second lens array 26b.

That is, the first lens array 26a has the same configuration of that of the first lens array 25a of the first lens integrator unit 25 and the second lens array 26b has the same configuration of that of the second lens array 25b of the first lens integrator unit 25.

Moreover, in the embodiment, a case where the second lens integrator unit 26 is separately formed from the first lens integrator unit 25 is described as an example, but may be integrally formed.

The first lens array 26a includes a plurality of the first small lenses 26am and the second lens array 26b includes a plurality of the second small lenses 26bm. In the embodiment, the first lens array 26a and the second lens array 26b correspond to "a pair of lens arrays" of the claims.

The second lens array 26b separates the lighting light WL' into a plurality of small light beam fluxes. The first small lens 26am forms an image on the second small lens 26bm corresponding to the small light beam flux. The image formed on the second small lens 26bm is derived from the diffusion blue light BL' and the fluorescent light YL'. That is, a secondary light source image of the diffusion blue light BL' and a secondary light source image of the fluorescent light YL' are formed in the second lens array 26b.

In the embodiment, the first lens integrator unit 25 and the second lens integrator unit 26 are disposed at the same position in a direction (the Y direction) parallel to the optical axis ax3 and the optical axis ax4. That is, the second lens array 25b and the second lens array 26b are disposed at the same position in the Y direction. Therefore, in the embodiment, the secondary light source image of the lighting light WL' and the secondary light source image of the lighting light WL form an image on the same plane (a plane parallel to the XZ plane) orthogonal to the optical axis ax3 and the optical axis ax4.

The lighting light WL' passing through the second lens integrator unit 26 is incident on the polarization conversion element 27 and is converted into the linear polarized light. The lighting light WL' passing through the polarization conversion element 27 is incident on the color separation optical system 3 via the superimposing lens 28. The superimposing lens 28 superimposes the plurality of small light beam fluxes constituting the lighting light WL' to each other in the lighting area.

In the embodiment, the first lens integrator unit 25 and the second lens integrator unit 26 cooperate with the superimposing lens 28 to uniformize the illuminance distribution in the lighting area.

In the embodiment, the white light is generated by mixing the blue light and the yellow light. The blue light is configured of the diffusion blue light BL generated by the first diffusion element 18 and the diffusion blue light BL' generated by the second diffusion element 24. The yellow light is configured of the fluorescent light YL generated by the first fluorescent light emitting element 16 and the fluorescent light YL' generated by the second fluorescent light emitting element 22. In other words, the white light W is configured of the lighting light WL and the lighting light WL'.

Therefore, it is possible to suppress each light amount incident on the first fluorescent light emitting element 16, the first diffusion element 18, the second fluorescent light emitting element 22, and the second diffusion element 24 compared to a case where the white light W is configured of only one of the lighting light WL and the lighting light WL'.

Therefore, it is possible to reduce the temperature rise of the temperature of the fluorescent body layer 16a or the fluorescent body layer 22a and reduce a decrease in light emission efficiency of the fluorescent body due to a phenomenon of temperature quenching. Therefore, since the temperature rise of the fluorescent body layer 16a or the fluorescent body layer 22a is reduced, the light source device 2 can emit the fluorescent light YL and YL' having a high output.

In addition, it is possible to prevent occurrence of troubles such as excessively strong light being incident on the first diffusion element 18 or the second diffusion element 24 so that the diffusion reflection plate 18A or the diffusion reflection plate 24A damaged.

As described above, the length L1 of the optical path between the first pickup optical system 15 and the first homogenizer optical system 12 is equal to the length L2 of the optical path between the second pickup optical system 21 and the second homogenizer optical system 19. Therefore, the light amount incident on the fluorescent body layer 22a of the second fluorescent light emitting element 22 is substantially equal to the light amount incident on the fluorescent body layer 16a of the first fluorescent light emitting element 16. That is, the brightness of the fluorescent light YL' emitted from the fluorescent body layer 22a is substantially equal to the brightness of the fluorescent light YL emitted from the fluorescent body layer 16a.

In addition, the length L3 of the optical path between the third pickup optical system 17 and the first homogenizer optical system 12 is equal to the length L4 of the optical path between the fourth pickup optical system 23 and the second homogenizer optical system 19. Therefore, the light amount incident on the diffusion reflection plate 24A of the second diffusion element 24 is substantially equal to the light amount incident on the diffusion reflection plate 18A of the first diffusion element 18. That is, the brightness of the diffusion blue light BL' emitted from the diffusion reflection plate 24A is substantially equal to the brightness of the diffusion blue light BL emitted from the diffusion reflection plate 18A.

Therefore, the lighting light WL has substantially the same brightness unevenness and substantially the same color unevenness as those of the lighting light WL'. Therefore, it is easy to reduce the lighting unevenness in the lighting area.

As described above, the secondary light source image of the lighting light WL' and the secondary light source image of the lighting light WL form an image on the same plane. In this case, it is possible to preferably superimpose the lighting light WL' and the lighting light WL on the lighting area by using the common superimposing lens 28 with respect to the first lens integrator unit 25 and the second lens integrator unit 26.

Therefore, the projector 1 of the embodiment can brightly display an image of which the color unevenness is reduced on the screen SCR.

Second Embodiment

Next, a projector of a second embodiment will be described. A difference between the embodiment and the embodiment described above is a configuration of the light source device. Thus, a configuration of the light source device will be mainly described below. Moreover, the same reference numerals are given to the common components and configurations as the embodiment described above and the description will be omitted or simplified.

Figure 3:
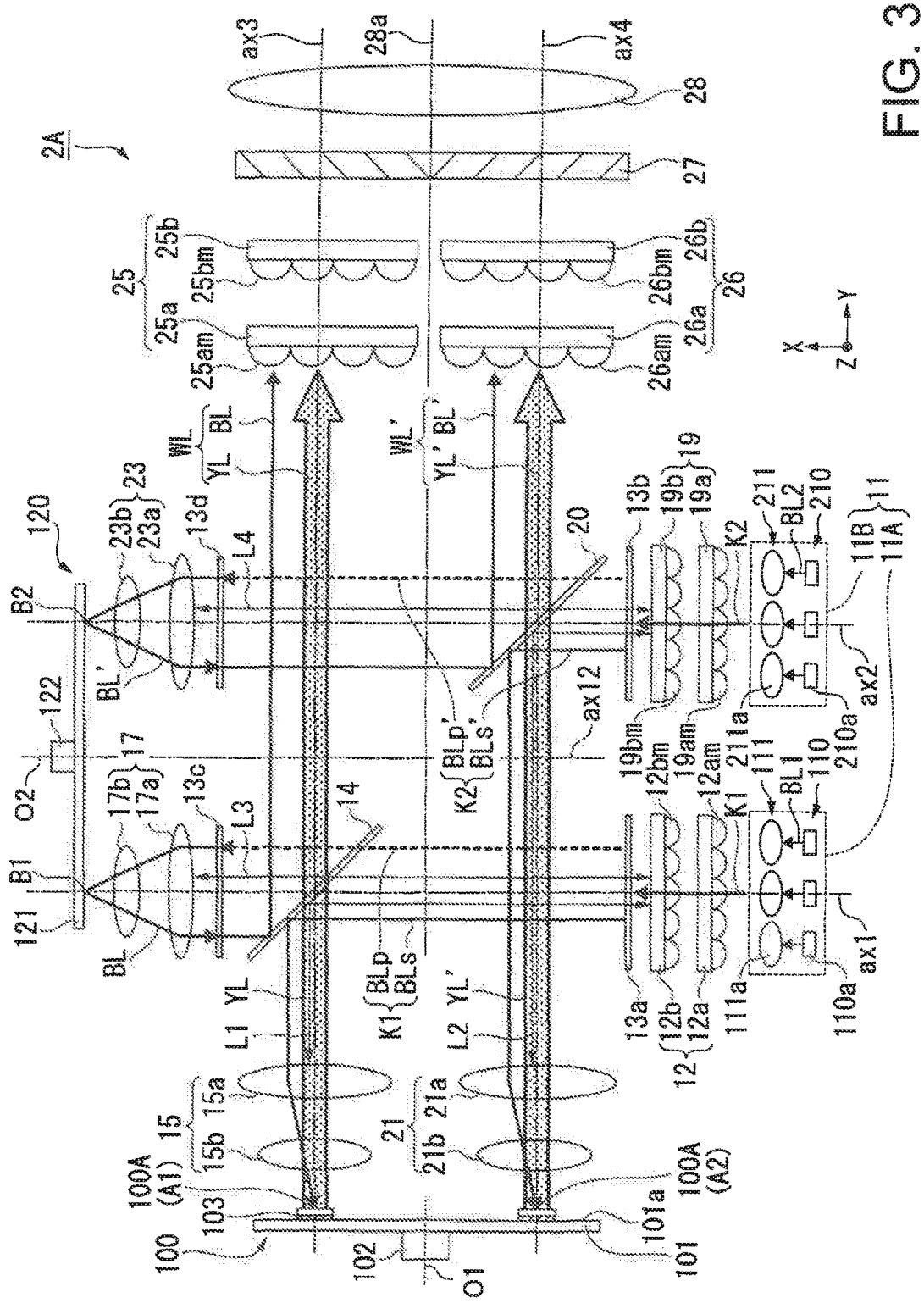
FIG. 3 is a diagram illustrating a schematic configuration of a light source device according to a second embodiment.

FIG. 3 is a diagram illustrating a schematic configuration of the light source device according to the second embodiment.

As illustrated in FIG. 3, a light source device 2A of the embodiment includes a light emitting device 11, a first homogenizer optical system 12, a first phase difference plate 13a, a first light separation element 14, a first pickup optical system 15, a rotation fluorescent plate 100, a third phase difference plate 13c, a third pickup optical system 17, a rotation diffusion plate 120, a second homogenizer optical system 19, a second phase difference plate 13b, a second light separation element 20, a second pickup optical system 21, a fourth phase difference plate 13d, a fourth pickup optical system 23, a first lens integrator unit 25, a second lens integrator unit 26, a polarization conversion element 27, and a superimposing lens 28.

The rotation fluorescent plate 100 includes a rotation substrate 101, a driving device 102 that drives the rotation substrate 101 to rotate, a fluorescent body layer 100A that is provided on the rotation substrate 101, a first fluorescence emitting section A1 and a second fluorescence emitting section A2. The rotation fluorescent plate 100 emits the fluorescent light YL to the same side as the side on which the light incident.

The rotation substrate 101 is configured of, for example, a metallic disk having excellent heat dissipation properties such as aluminum or copper and is rotatable around a predetermined rotation axis O1. The driving device 102 is configured of, for example, a motor or the like, and rotates the rotation substrate 101 around the rotation axis O1. In the embodiment, the rotation substrate 101 corresponds to "the first base material" of the claims and the rotation axis O1 corresponds to "the first rotation axis" of the claims.

In the embodiment, the fluorescent body layer 100A is formed in a ring shape around the rotation axis O1 on an upper surface 101a of the rotation substrate 101. A reflection section 103 is provided on a side opposite to the side of the fluorescent body layer 100A on which the light beam flux BLs is incident.

The fluorescent body layer 100A is disposed so as to face the first pickup optical system 15 and the second pickup optical system 21.

The first fluorescence emitting section A1 converts the light beam flux BLs and emits the light beam flux BLs as the fluorescent light YL, and the second fluorescence emitting section A2 converts the light beam flux BLs' and emits the light beam flux BLs' as the fluorescent light YL'.

The rotation diffusion plate 120 includes a diffusion reflection plate 121, a driving device 122 that drives the diffusion reflection plate 121 to rotate, a first diffusion light emitting section B1, and a second diffusion light emitting section B2. The rotation diffusion plate 120 emits the diffusion light toward the same side as the side on which the light is incident.

The diffusion reflection plate 121 is configured of, for example, a member having light reflectivity and the surface thereof has unevenness. The diffusion reflection plate 121 is rotatable around a predetermined rotation axis O2. The driving device 122 is configured of, for example, a motor or the like, and rotates the diffusion reflection plate 121 around the rotation axis O2. In the embodiment, the diffusion reflection plate 121 corresponds to "the second base material" of the claims, a surface of the diffusion reflection plate 121 having unevenness corresponds to "the diffusion section" in the claims, and the rotation axis O2 corresponds to "the second rotation axis" in the claims.

The diffusion reflection plate 121 is disposed to face the third pickup optical system 17 and the fourth pickup optical system 23. A region n which the light beam flux BLp is incident at a certain moment in the diffusion reflection plate 121 refers to the first diffusion light emitting section B1 and a region on which the light beam flux incident at a certain moment in the diffusion reflection plate 121 refers to the second diffusion light emitting section B2. The diffusion reflection plate 121 rotates but the first diffusion light emitting section B1 and the second diffusion light emitting section B2 do not move.

The circularly polarized diffusion blue light BL, which is reflected by the first diffusion light emitting section B1 and transmits the third pickup optical system 17, transmits again through the third phase difference plate 13c to become the S polarized light. The diffusion blue light BL of the S polarized light is incident and reflected on the first light separation element 14.

The circularly polarized diffusion blue light BL', which is reflected by the second diffusion light emitting section B2 and transmits the fourth pickup optical system 23, transmits again through the third phase difference plate 13c to become the S polarized light. The diffusion blue light BL' of the S polarized light is incident and reflected on the second light separation element 20.

As illustrated in FIG. 3, an optical axis 28a of the superimposing lens 28 is positioned between the first fluorescence emitting section A1 and the second fluorescence emitting section A2 in the X direction. Specifically, the optical axis 28a is positioned between the first fluorescence emitting section A1 and the second fluorescence emitting section A2 when viewed from a direction the Z direction in FIG. 3) perpendicular to a main light beam of the light beam flux BLp incident on the first light separation element 14 and the optical axis 28a of the superimposing lens 28.

Figure 4:
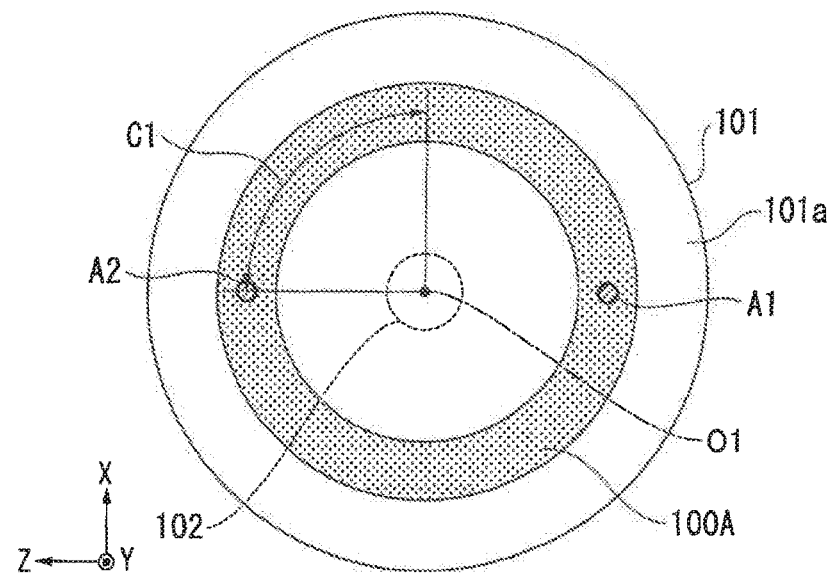
FIG. 4 is a view illustrating a configuration of a rotation fluorescent plate in a plan view.

FIG. 4 is a view illustrating a configuration of the rotation fluorescent plate 100 in a plan view. In the embodiment, the first fluorescence emitting section A1 refers to a region on which the light beam flux BLs is incident a certain moment in the fluorescent body layer 100A. The second fluorescence emitting section A2 refers to a region on which the light beam flux BLs' is incident at a certain moment in the fluorescent body layer 100A. The rotation fluorescent plate 100 rotates but the first fluorescence emitting section A1 and the second fluorescence emitting section A2 do not move.

First, a case where a distance between the first fluorescence emitting section A1 and the rotation axis O1 is equal to a distance between the second fluorescence emitting section A2 and the rotation axis O1 is considered. The second fluorescence emitting section A2 is at a position where the first fluorescence emitting section A1 is rotated by 180° around the rotation axis O1. Therefore, the first fluorescence emitting section A1 and the second fluorescence emitting section A2 are most separated from each other in a circumferential direction of the fluorescent body layer 100A.

The fluorescent body irradiated with the excitation light (the light beam flux BLs) in the first fluorescence emitting section A1 moves in the circumferential direction of the rotation substrate 101 according to the rotation of the rotation substrate 101, and irradiated with the excitation (the light beam flux BLs') in the second fluorescence emitting section A2. Similarly, the fluorescent body irradiated with the excitation light (the light beam flux BLs') in the second fluorescence emitting section A2 moves in the circumferential direction of the rotation substrate 101 according to the rotation of the rotation substrate 101, and irradiated with the excitation light (the light beam flux BLs) the first fluorescence emitting section A1. That is, the fluorescent body that is at a specific position of fluorescent body layer 100A is irradiated with the excitation light whenever the rotation substrate 101 is rotated by 180°.

However, in the embodiment, the second fluorescence emitting section. A2 is at the position where the first fluorescence emitting section A1 is rotated by 180° around the rotation axis O1. Therefore, it is possible to prevent the excitation light from being incident on the fluorescent body that is at a specific position of the fluorescent body layer 100A at short intervals. Therefore, it is possible to reduce the temperature rise of the fluorescent body layer 100A.

Moreover, a relationship between the position of the first fluorescence emitting section A1 and the position of the second fluorescence emitting section A2 is not limited to the above-described relationship. The second fluorescence emitting section A2 may be at a position (range indicated by a symbol C1 illustrated in FIG. 4) where the first fluorescence emitting section A1 is rotated around the rotation axis O1 by an angle greater than or equal to 90° and less than or equal to 180°.

Figure 5A:
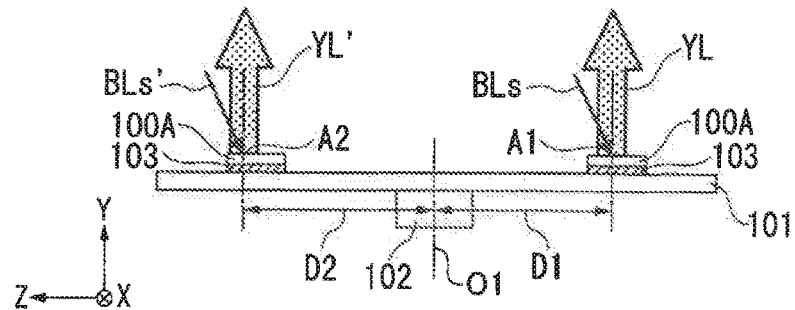
FIG. 5(a) is a side view and FIG. 5(b) is a plan view of a rotation fluorescent plate according to a modification example.
Figure 5B:
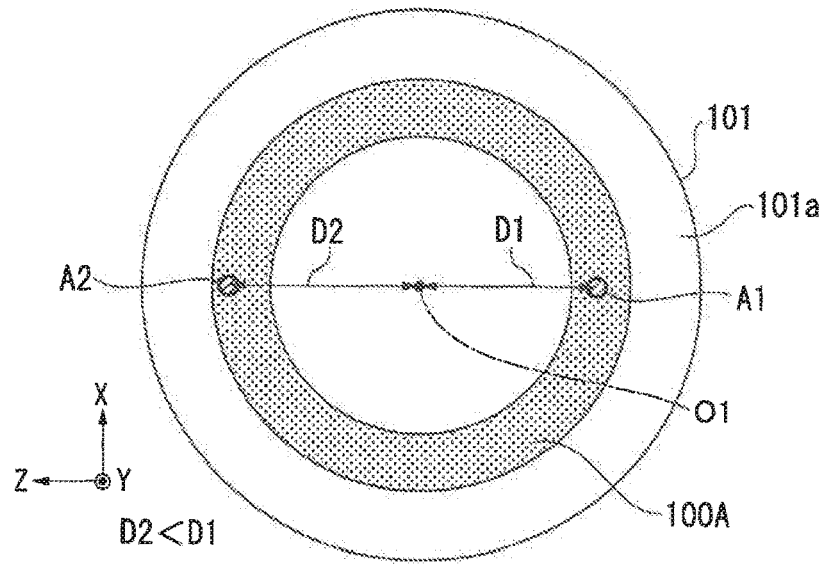

FIG. 5(a) is a side view illustrating a main configuration of a rotation fluorescent plate 100 according a modification example and FIG. 5(b) is a plan view illustrating a main configuration of a rotation fluorescent plate 100 according to the modification example.

As illustrated in FIG. 5 (a), a distance D1 between a first fluorescence emitting section A1 and a rotation axis O1 may be different from a distance D2 between a second fluorescence emitting section A2 and the rotation axis O1.

According to the configuration, the fluorescent body that is at a specific position of a fluorescent body layer 100A is irradiated with the excitation light whenever a rotation substrate 101 is rotated. Therefore, an interval at which the fluorescent body that is at a specific position of the fluorescent body layer 100A is irradiated with the excitation light is longer than a case where the distance D1 and the distance D2 are equal to each other. Therefore, it is possible to further reduce the temperature rise of the fluorescent body layer 100A.

Here, in FIG. 3, a central optical axis of a light emitting device 11 refers to an optical axis ax12. The optical axis ax12 passes through centers of the optical axis ax1 of the first light emitting device 11A and the optical axis ax2 of the second light, emitting device 11B.

As illustrated in FIG. 3, the optical axis ax12 is positioned between the first diffusion light emitting section B1 and the second diffusion light emitting section E2 in the Y direction. Specifically, the optical axis ax12 is positioned between the first diffusion light emitting section B1 and the second diffusion light emitting section B2 when viewed from a direction (the Z direction of FIG. 3) perpendicular to the optical axis 28a of the superimposing lens 28 and the optical axis ax12 of the light emitting device 11 orthogonal to the optical axis 28a. In the embodiment, the optical axis ax12 coincides with the rotation axis O2 of the rotation diffusion plate 120.

Figure 6:
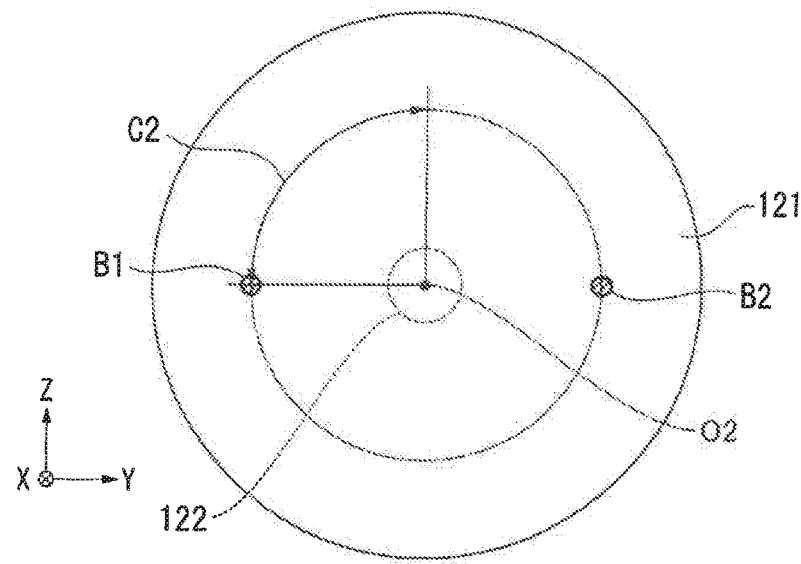
FIG. 6 is a view illustrating a configuration of a rotation diffusion plate in a plan view.

FIG. 6 is a view illustrating a configuration of the rotation diffusion plate 120 in a plan view.

First, a case where a distance between the first diffusion light emitting section B1 and the rotation axis O2 is equal to a distance between the second diffusion light emitting section B2 and the rotation axis O2 is considered. The second diffusion light emitting section 132 is at a position where the first diffusion light emitting section 31 is rotated by 180° around the rotation axis O2. Therefore, the first diffusion light emitting section B1 and the second diffusion light emitting section 132 are most separated from each other in a circumferential direction of the diffusion reflection plate 121.

The diffusion section irradiated with the light beam flux BLp in the first diffusion light emitting section 131 moves in the circumferential direction of the diffusion reflection plate 121 according to the rotation of the diffusion reflection plate 121, and irradiated with the light beam flux BLp' in the second diffusion light emitting section 132. Similarly, the diffusion section irradiated with the light beam flux BLp' in the second diffusion light emitting section B2 moves in the circumferential direction of the diffusion reflection plate 121 according to the rotation of the diffusion reflection plate 121, and irradiated with the light beam flux BLp in the first diffusion light emitting section 31. That is, the diffusion section that is at a specific position of the diffusion reflection plate 121 is irradiated with the light beam flux BLp or the light beam flux BLp' whenever the diffusion reflection plate 121 is rotated by 180°.

However, in the embodiment, the second diffusion light emitting section B2 is at the position where the first diffusion light emitting section B1 is rotated by 180° around the rotation axis O2. Therefore, it is possible to prevent light from being incident on the diffusion section that is at a specific position of the diffusion reflection plate 121 at short intervals. Therefore, it is possible to reduce the temperature rise of the diffusion reflection plate 121.

Moreover, a relationship between the position of the first diffusion light emitting section B1 and the position of the second diffusion light emitting section B2 is not limited to the above-described relationship. The second diffusion light emitting section B2 may be at a position (range indicated by a symbol C2 illustrated in FIG. 6) where the first diffusion light emitting section B1 is rotated around the rotation axis O2 by an angle greater than or equal to 90° and less than or equal to 180°.

Figure 7A:
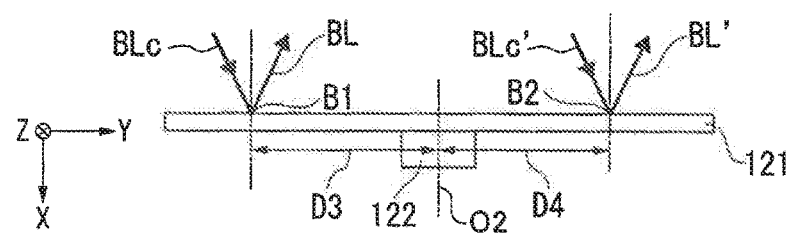
FIG. 7(a) is a side view and FIG. 7(b) is a plan view of a rotation diffusion plate according to a modification example.
Figure 7B:
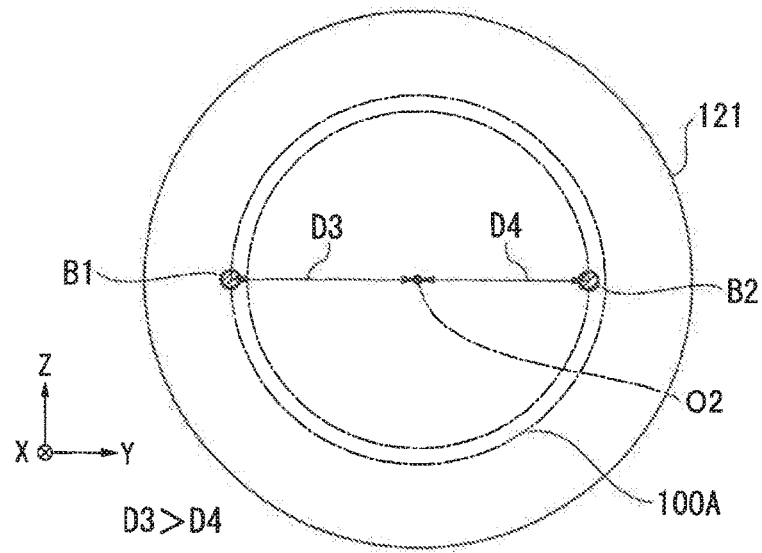

FIG. 7(a) is a side view of a main configuration of a rotation diffusion plate 120 and FIG. 7 (b) is a plan view illustrating the main configuration of the rotation diffusion plate 120 according to a modification example.

As illustrated in FIG. 7 (a), a distance D3 between a first diffusion light emitting section 31 and a rotation axis O2 may be different from a distance D4 between a second diffusion light emitting section B2 and the rotation axis O2.

According to the configuration, the diffusion section that is at a specific position of a diffusion reflection plate 121 is irradiated with, for example, the light beam flux BLp whenever the diffusion reflection plate 1 rotated. Therefore, an interval at which the diffusion section that is at a specific position of the diffusion reflection plate 121 is irradiated with the light is longer than a case where the distance D3 and the distance D4 are equal to each other. Therefore, it is possible to further reduce the temperature rise of the diffusion reflection plate 121.

According to the embodiment, the rotation fluorescent plate 100 including the first fluorescence emitting section A1 and the second fluorescence emitting section A2, and the rotation diffusion plate 120 including the first diffusion light emitting section B1 and the second diffusion light emitting section 32 are provided. Therefore, it is possible to reduce the device configuration in size compared to that of the first embodiment.

Third Embodiment

Next, a projector of a third embodiment will be described. A difference between the embodiment and the embodiment described above is a fact in which a light source unit is provided instead of the light source device. Thus, a configuration of the light source unit will be mainly described below. Moreover, the same reference numerals are given to the common components and configurations as the embodiment described above and the description will be omitted or simplified.

Figure 8:
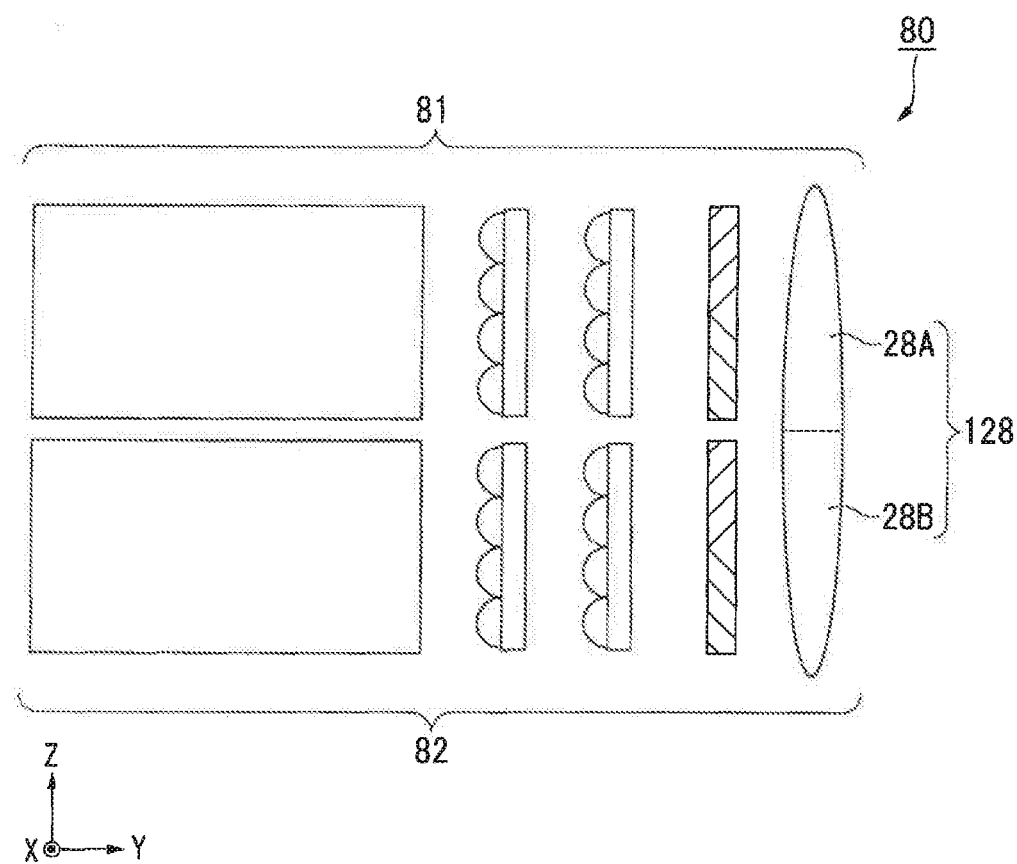
FIG. 8 is a view illustrating a side surface configuration of a light source unit of a third embodiment.

FIG. 8 is a view illustrating a side surface configuration of a light source unit 80. As illustrated in FIG. 8, the light source unit 80 includes a first light source device 81 and a second light source device 82, and has a structure in which the first light source device 81 and the second light source device 82 are stacked. For example, the first light source device 81 is disposed above the second light source device 82 in a vertical upward direction. Moreover, in FIG. 8, a part of each configuration member of the first light source device 81 and the second light source device 82 is illustrated in a simplified state.

In the embodiment, each of the first light source device 81 and the second light source device 82 is configured of the light source device 2 of the first embodiment. Moreover, each of the first light source device 81 and the second light source device 82 may be configured of the light source device 2 of the second embodiment.

Moreover, it is necessary to superimpose a lighting light WL and a lighting light WL' generated by the first light source device 81 and a lighting light WL and the lighting light WL' generated by the second light source device 82 on each other at a lighting area. Therefore, in the embodiment, two superimposing lenses 28 are replaced by one superimposing lens 128.

Figure 9:
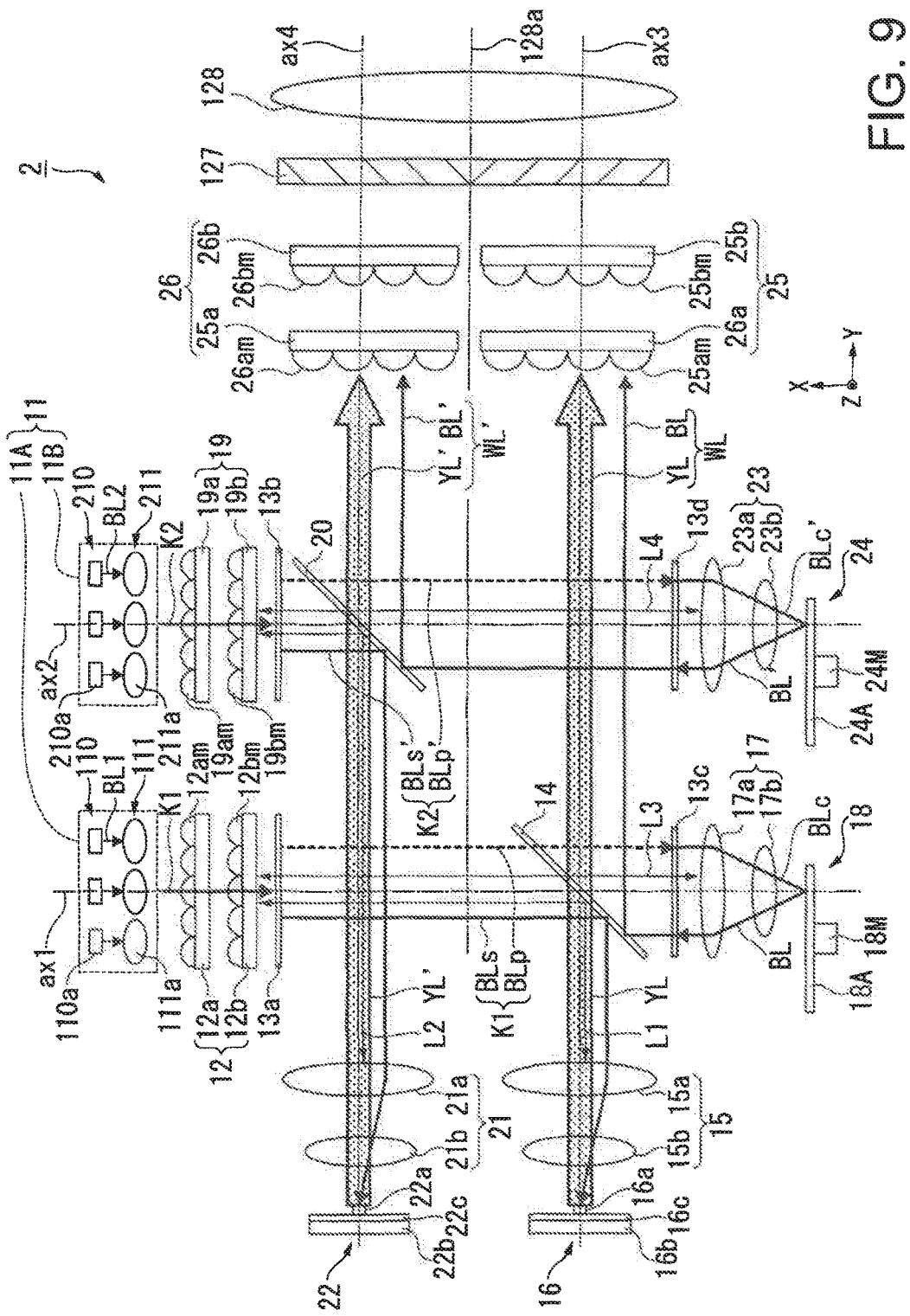
FIG. 9 is a diagram of a plane configuration of a second light source device.

FIG. 9 is a diagram of a plane configuration of a second light source device 82. As illustrated in FIG. 9, each configuration member of the second light source device 82 is disposed so that a light emitting device 11 emits a light beam flux K1 and a light beam flux K2 in a −X direction. On the other hand, as illustrated in FIG. 2, in the first light source device 81, each configuration member of the first light source device 81 is disposed so that the light emitting device 11 emits the light beam flux K1 and the light beam flux K2 in a +X direction. That is, a layout of each configuration member of the first light source device 81 and a layout of each configuration member of the second light source device 82 are line-symmetrical with respect to an optical axis 128a of the superimposing lens 128.

According to the configuration, when the light source unit 80 is viewed in a plan view (when viewed from a +Z, direction), the light emitting devices 11 in the first light source device 81 and the second light source device 82 do not overlap with each other. In addition, also, the first light separation elements 14 do not overlap with each other. Also, the second light separation elements 20 do not overlap with each other. Also, the diffusion reflection plates 18A do not overlap with each other. Also, the second diffusion elements 24 do not overlap with each other. Therefore, since the first light source device 81 and the second light source device 82 can be disposed in close to overlap to each other in the direction, it is possible to reduce the light source unit 80 in size.

In addition, although an embodiment of the invention described as an example, the invention is not intended to be necessarily limited to the configuration of the embodiments described above and it is possible to make various changes without departing from the scope of the invention.

For example, in the first embodiment, although the reflective type is exemplified as the first fluorescent light emitting element 16, the second fluorescent light emitting element 22, the first diffusion element 18, and the second diffusion element 24, a transmission type may be used. In addition, similarly, in the second embodiment, although the reflective type is exemplified as the rotation fluorescent plate 100 and the rotation diffusion plate 120, a transmission type may be used.

In addition, in the embodiments, although the projector 1 including three optical modulation devices 4R, 4G, and 4B is exemplified, it is possible to apply one optical modulation device to a projector which displays a color image. Further-more, as the optical modulation device, it is not limited to the liquid crystal panel and, for example, a digital mirror device or the like can be used.

The entire disclosure of Japanese Patent Application No. 2017-042644, filed on Sep. 24, 2015 is expressly incorporated by reference herein.

What is claimed is:

1. A light source device comprising:
    a light emitting device that emits a first light and a second light;
    a first light separation element that separates the first light into a first light beam flux and a second light beam flux;
    a second light separation element that separates the second light into a third light beam flux and a fourth light beam flux;
    at least one fluorescent body layer that includes a first fluorescence emitting section on which the first light beam flux is incident and a second fluorescence emitting section on which the third light beam flux is incident; and
    at least one diffusion section that includes a first diffusion light emitting section on which the second light beam flux is incident and a second diffusion light emitting section on which the fourth light beam flux is incident.

2. The light source device according to claim 1, further comprising:
    a first homogenizer optical system that is provided on an optical path of the first light between the light emitting device and the first light separation element;
    a second homogenizer optical system that is provided on an optical path of the second light between the light emitting device and the second light separation element;
    a first condensing optical system that is provided on an optical path of the first light beam flux between the first light separation element and the first fluorescence emitting section;
    a second condensing optical system that is provided on an optical path of the third light beam flux between the second light separation element and the second fluorescence emitting section;
    a third condensing optical system that is provided on an optical path of the second light beam flux between the first light separation element and the first diffusion light emitting section; and
    a fourth condensing optical system that is provided on an optical path of the fourth light beam flux between the second light separation element and the second diffusion light emitting section,
    wherein a length of the optical path between the first condensing optical system and the first homogenizer optical system is equal to a length of the optical path between the second condensing optical system and the second homogenizer optical system, and
    wherein a length of the optical path between the third condensing optical system and the first homogenizer optical system is equal to a length of the optical path between the fourth condensing optical system and the second homogenizer optical system.

3. The light source device according to claim 1, further comprising:
    a first lens integrator optical system and a second lens integrator optical system,
    wherein the first fluorescence emitting section emits a third light toward the first light separation element,
    wherein the second fluorescence emitting section emits a fourth light toward the second light separation element,
    wherein the first diffusion light emitting section emits a fifth light toward the first light separation element,
    wherein the second diffusion light emitting section emits a sixth light toward the second light separation element,
    wherein the third light and the fifth light are synthesized by the first light separation element,
    wherein the fourth light and the sixth light are synthesized by the second light separation element,
    wherein the third light and the fifth light synthesized by the first light separation element are incident on the first lens integrator optical system,
    wherein the fourth light and the sixth light synthesized by the second light separation element are incident on the second lens integrator optical system, and
    wherein a secondary light source image formed by the third light, a secondary light source image formed by the fourth light, a secondary light source image formed by the fifth light, and a secondary light source image formed by the sixth light are formed on the same plane.

4. The light source device according to claim 3, further comprising:
    a superimposing lens on which the light emitted from the first lens integrator optical system and the light emitted from the second lens integrator optical system are incident.

5. The light source device according to claim 4, further comprising:
    a first base material that is capable of rotating around a first rotation axis and supports at least one fluorescent body layer,
    wherein at least one fluorescent body layer is configured of one fluorescent body layer provided around the first rotation axis, and
    wherein an optical axis is positioned between the first fluorescence emitting section and the second fluorescence emitting section when viewed from a direction perpendicular to a main light beam of the first light incident on the first light separation element and the optical axis of the superimposing lens.

6. The light source device according to claim 5,
    wherein a distance between the first fluorescence emitting section and the first rotation axis is different from a distance between the second fluorescence emitting section and the first rotation axis.

7. The light source device according to claim 4, further comprising:
    a second base material that is capable of rotating around a second rotation axis and supports at least one diffusion section,
    wherein at least one diffusion section is configured of one diffusion section provided around the second rotation axis, and
    wherein a central optical axis is positioned between the first diffusion light emitting section and the second diffusion light emitting section when viewed from a direction perpendicular to the optical axis of the superimposing lens and the central optical axis of the light emitting device orthogonal to the optical axis.

8. The light source device according to claim 7,
    wherein a distance between the first diffusion light emitting section and the second rotation axis is different from a distance between the second diffusion light emitting section and the second rotation axis.

9. The light source device according to claim 2,
    wherein each of the first homogenizer optical system and the second homogenizer optical system is configured by a pair of lens arrays.

10. The light source device according to claim 2,
wherein the first condensing optical system and the second condensing optical system have the same configuration, and
wherein the third condensing optical system and the fourth condensing optical system have the same configuration.

11. The light source device according to claim 3,
wherein each of the first lens integrator optical system and the second lens integrator optical system is configured of a pair of lens arrays.

12. A light source unit comprising:
a first light source device and a second light source device,
wherein each of the first light source device and the second light source device is configured of the light source device according to claim 4, and
wherein a superimposing lens in the first light source device and a superimposing lens in the second light source device are configured of one lens member.

13. A projector comprising:
a lighting apparatus that includes the light source device according to claim 1;
an optical modulation device that forms an image light by modulating light emitted from the lighting apparatus according to image information; and
a projection optical system that projects the image light.

* * * * *